(12) United States Patent
Brewer

(10) Patent No.: US 11,872,684 B1
(45) Date of Patent: Jan. 16, 2024

(54) GRIPPING SYSTEM AND APPARATUS FOR ATTACHING TO A CARD

(71) Applicant: Danielle Brewer, Blanchard, OK (US)

(72) Inventor: Danielle Brewer, Blanchard, OK (US)

( * ) Notice: Subject to any disclaimer, the term of this patent is extended or adjusted under 35 U.S.C. 154(b) by 330 days.

(21) Appl. No.: 17/009,067

(22) Filed: Sep. 1, 2020

(51) Int. Cl.
*B25B 9/02* (2006.01)
*B25J 1/02* (2006.01)
*A45C 11/18* (2006.01)

(52) U.S. Cl.
CPC ............... *B25J 1/02* (2013.01); *A45C 11/182* (2013.01)

(58) Field of Classification Search
CPC .................................. B25J 1/02; A45C 11/182
USPC .................................................. 294/99.1, 99.2
See application file for complete search history.

(56) References Cited

U.S. PATENT DOCUMENTS

| | | | | |
|---|---|---|---|---|
| 2,846,134 A * | 8/1958 | Moubayed | ............. | B65D 33/10 229/117.26 |
| 4,248,465 A * | 2/1981 | Halstead | .................... | B25J 1/04 81/487 |
| 4,330,936 A * | 5/1982 | Swarth | ................... | A61J 7/0007 269/275 |
| 5,044,776 A * | 9/1991 | Schramer | ............... | B65D 33/20 383/89 |
| 5,112,016 A * | 5/1992 | Pull | ........................... | B25J 1/04 294/99.2 |
| 5,534,346 A * | 7/1996 | Robinson | ............... | A61B 50/00 428/354 |
| 6,375,239 B1* | 4/2002 | Reed | .................... | B65D 5/4212 229/117.23 |
| 8,091,936 B1* | 1/2012 | Graziano | .................. | B25B 9/00 294/99.2 |
| 8,801,065 B1* | 8/2014 | Jones | .................... | G06F 1/1613 294/25 |
| 9,604,347 B2* | 3/2017 | Calman | ..................... | B25B 9/02 |
| D790,629 S * | 6/2017 | Gruenwald | ......... | B32B 37/1292 D19/69 |
| 11,020,564 B2* | 6/2021 | Madlung | ............ | A61M 25/0111 |
| D958,287 S * | 7/2022 | Bulla | .......................... | D22/122 |

* cited by examiner

*Primary Examiner* — Paul T Chin
(74) *Attorney, Agent, or Firm* — AVEK IP, LLC

(57) ABSTRACT

A card gripping apparatus includes a body extending from a first end to a second end, the body being composed of a rigid material; and a securement device extending from the body, the securement device having a first side and a second side creating an opening therebetween; the first side and the second side are to secure to a card; and the body provides for a gripping location to maneuver the card.

7 Claims, 4 Drawing Sheets

GRIPPING SYSTEM AND APPARATUS FOR ATTACHING TO A CARD

BACKGROUND

1. Field of the Invention

The present invention relates generally to systems and methods to aid in the gripping and maneuvering of cards, documents, or the like, and more specifically to a griping apparatus that provides for an easy selection and removal of a credit card or document.

2. Description of Related Art

Credit cards are well known in the art and are effective payment devices. For example, FIG. 1 depicts a conventional credit card 101 having a body 103 with an edge 105. Conventionally, users will store credit cards in wallets, or within purses, or the like. Upon the need for the card, the user will grasp the edge of the card for removal and use.

One of the problems commonly associated with card 101 is limited use. For example, it is a common practice for individuals to have stylized and manicured nails, which can result in a challenge when trying to remove the card from a wallet. The user's nails may become damaged during this process, resulting in costly repairs. This problem is also associated with other items, such as documents or the like.

Accordingly, although great strides have been made in the area of card systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
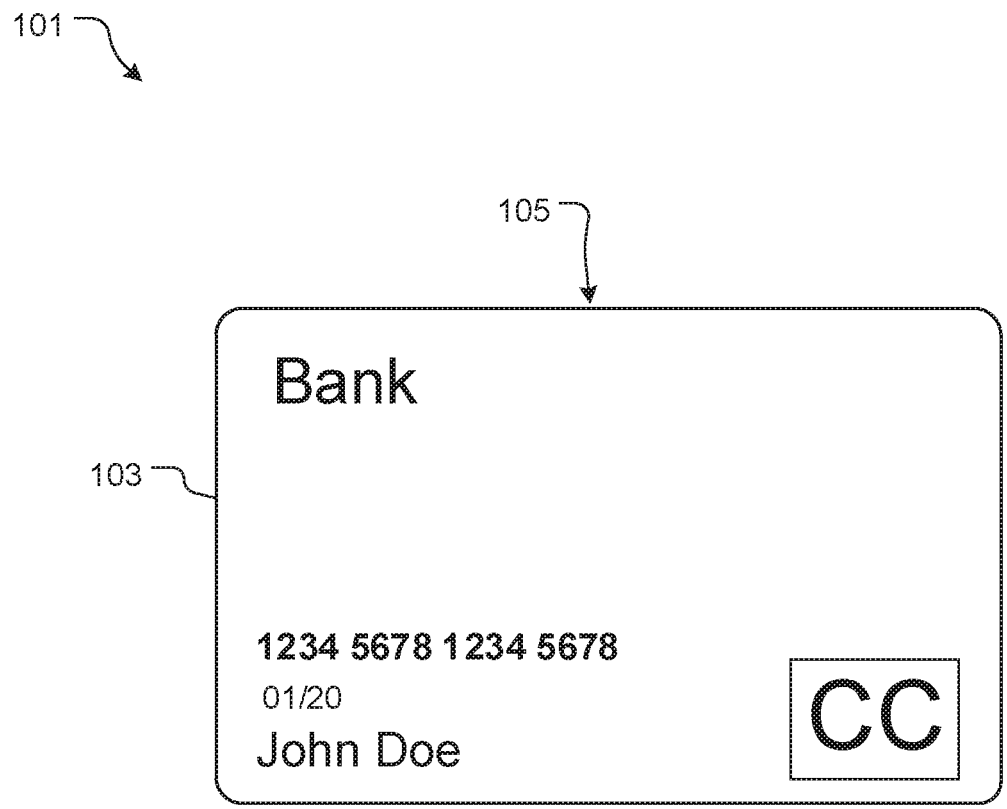
FIG. 1 is a front view of a common credit card.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional credit card systems. Specifically, the present application includes a gripping apparatus that secures to the edge of a card or other document, thereby providing for a grip to allow for easier user manipulation of the card. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
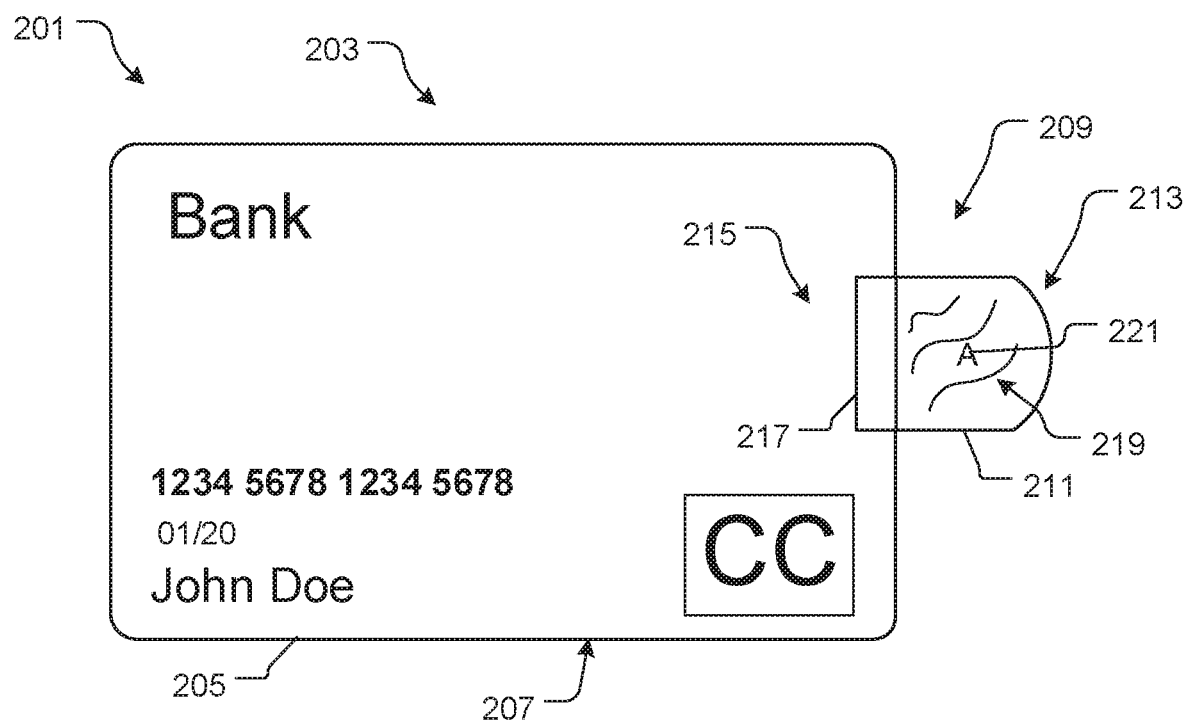
FIG. 2 is a front view of a gripping system in accordance with the present application.

Referring now to the drawings wherein like reference characters identify corresponding or similar elements throughout the several views, FIG. 2 depicts a front view of a gripping system 201 in accordance with a preferred embodiment of the present application. It will be appreciated that system 201 overcomes one or more of the above-listed problems commonly associated with conventional credit card systems.

In the contemplated embodiment, system 201 includes a card 203 having a body 205 with an edge 207. System 201 further includes a gripping apparatus 209 that includes a body 211 extending from a first end 213 to a second end 215, the body 211 being composed of a rigid or semi-rigid material. Further, the gripping apparatus 209 includes a securement device 217 integral with and attached to body 211. As shown, it is contemplated that a textured surface 219 can be incorporated into body 211 to increase grip. In some embodiments, the apparatus 209 further includes a logo 221 printed thereon for advertisement or aesthetical purposes.

Figure 3:
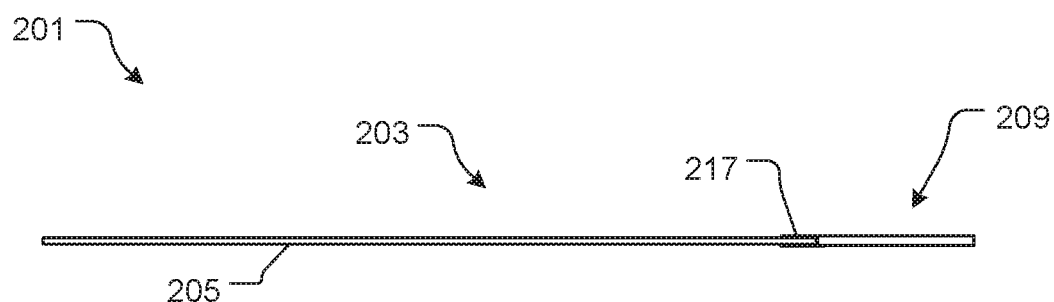
FIG. 3 is a side view of the system of FIG. 2.

In FIG. 3, a side view depicts the attachment of gripping apparatus 209 to an edge of the card 203 via the securement device 217.

Figure 4:
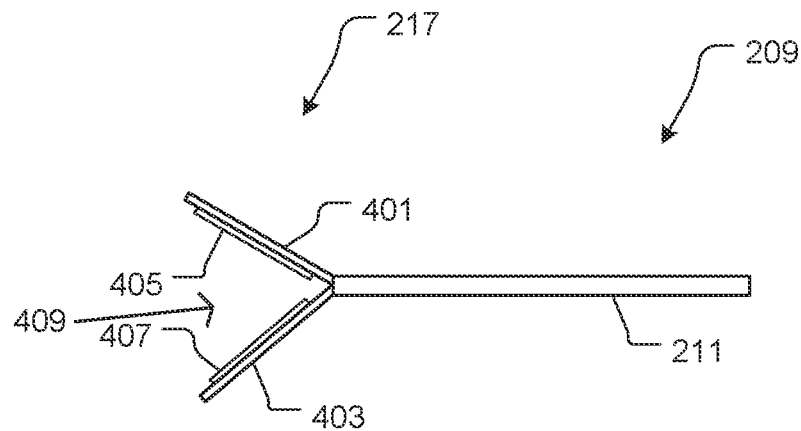
FIG. 4 is a side view of the gripping apparatus of FIG. 2 in an open configuration.
Figure 5:
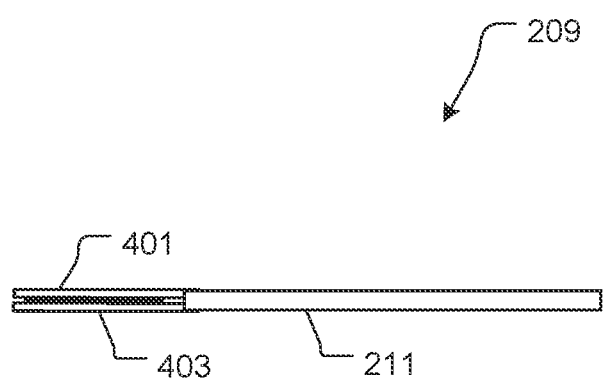
FIG. 5 is a side view of the gripping apparatus of FIG. 2 in a closed configuration.

In FIGS. 4 and 5, side views further depict gripping apparatus 209. As shown, the securement device 217 extends from the body 211, the securement device 217 having a first side 401 and a second side 403, each having an adhesive layer 405, 407 thereon. It should be appreciated that the securement device creates an opening 409 wherein the edge of the card is inserted. The securement device 217 then closing and securing to the card in a closed configuration, shown in FIG. 5.

It should be appreciated that one of the unique features believed characteristic of the present application is the gripping apparatus which provides for easy gripping and maneuvering of the credit card. It should be appreciated that the gripping apparatus can further be used with other items, such as documents, folders, or the like.

Figure 6:
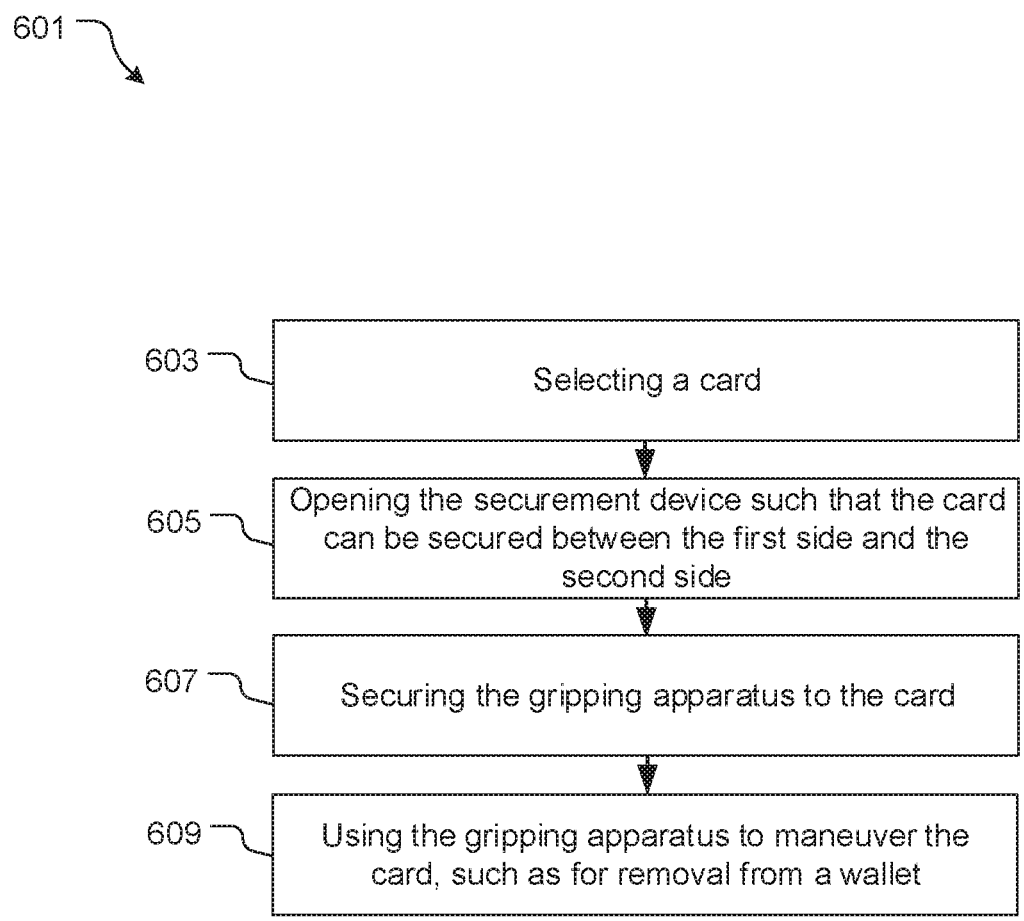
FIG. 6 is a flowchart of a method of use of the system of FIG. 2.

In FIG. 6, a flowchart 601 depicts the method of use of system 201. During use, the user will select a card and secure the gripping apparatus thereto via the securement device, as shown with boxes 603, 605, 607. The user can then proceed to use the gripping apparatus to maneuver the card, such as during removal of the card from a wallet or purse, as shown with box 609.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A card gripping apparatus, consisting essentially of:
   a body extending from a first end to a second end and from a top end to a bottom end, and
   a securement device extending from the body, the securement device having a first side and a second side creating an opening therebetween, the first side and the second side each having an adhesive surface;
   wherein the first side and the second side are configured to secure to a card; and
   wherein the body provides for a gripping location to maneuver the card.

2. The apparatus of claim 1, wherein the body has a uniform thickness from the top end to the bottom end and from the first end to the second end.

3. The apparatus of claim 1, wherein a top surface of the securement device and a top surface of the body are substantially planar with one another and a bottom surface of the securement device and a bottom surface of the body are substantially plan with one another.

4. A credit card gripping system, comprising:
   a credit card having a body with a top edge, a bottom edge, a first side edge, and a second side edge, the first side edge and the second side edge having a length and being shorter than the top edge and the bottom edge;
   a gripping apparatus, consisting essentially of:
      a body extending from a first end to a second end and from a top end to a bottom end, the body having a uniform thickness from the top end to the bottom end and from the first end to the second end; and
      a securement device extending from the body, the securement device having a first side and a second side creating an opening therebetween, the first side and the second side each have an adhesive surface;
      wherein a top surface of the body and a top surface of the securement device are substantially planar with one another; and
      wherein a bottom surface of the body and a bottom surface of the securement device are substantially plan with one another;
   wherein the first side and the second side are secured to the credit card only via the adhesive surface of each of the first side and the second side, the credit card is positioned within the opening; and
   wherein the body provides for a gripping location to maneuver the credit card.

5. A method of improving grip of a card, the method comprising:
   providing the card;
   providing a gripping apparatus consisting essentially of a body extending from a first end to a second end and from a top end to a bottom end, and a securement device extending from the body, the securement device having a first side and a second side creating an opening therebetween, the first side and the second side each having an adhesive surface;
   securing the gripping apparatus to the card via the securement devices; and
   using the gripping apparatus to maneuver the card.

6. The method of claim 5, wherein the body has a uniform thickness from the top end to the bottom end and from the first end to the second end.

7. The method of claim 5, wherein a top surface of the securement device and a top surface of the body are substantially planar with one another and a bottom surface of the securement device and a bottom surface of the body are substantially plan with one another.

* * * * *